US007793342B1

(12) United States Patent
Ebrahimi et al.

(10) Patent No.: US 7,793,342 B1
(45) Date of Patent: *Sep. 7, 2010

(54) SINGLE SIGN-ON WITH BASIC AUTHENTICATION FOR A TRANSPARENT PROXY

(75) Inventors: Hashem Mohammad Ebrahimi, Salt Lake City, UT (US); Bradley W Rupp, Riverton, UT (US); Mel J. Oyler, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 1430 days.

This patent is subject to a terminal disclaimer.

(21) Appl. No.: 10/270,912

(22) Filed: Oct. 15, 2002

(51) Int. Cl.
G06F 7/04 (2006.01)

(52) U.S. Cl. .................. 726/8; 726/3; 726/4; 726/5; 726/11; 713/166; 713/167

(58) Field of Classification Search .............. 726/2–4, 726/10, 17, 21; 713/202
See application file for complete search history.

(56) References Cited

U.S. PATENT DOCUMENTS

| 5,623,601 | A | * | 4/1997 | Vu ........................... 726/12 |
| 5,875,296 | A | | 2/1999 | Shi et al. .................. 395/188.01 |
| 5,908,469 | A | | 6/1999 | Botz et al. ................... 713/201 |
| 5,913,025 | A | | 6/1999 | Higley et al. ............ 395/187.01 |
| 6,003,084 | A | * | 12/1999 | Green et al. ................. 709/227 |
| 6,047,376 | A | | 4/2000 | Hosoe et al. ................. 713/201 |
| 6,067,623 | A | * | 5/2000 | Blakley et al. ................ 726/5 |
| 6,092,196 | A | | 7/2000 | Reiche et al. ................. 713/200 |
| 6,298,383 | B1 | | 10/2001 | Gutman et al. ............... 709/229 |
| 6,401,125 | B1 | * | 6/2002 | Makarios et al. ............ 709/229 |
| 6,629,246 | B1 | * | 9/2003 | Gadi ............................ 726/8 |
| 6,701,438 | B1 | * | 3/2004 | Prabandham et al. ........ 726/11 |
| 2002/0188869 | A1 | * | 12/2002 | Patrick ........................ 713/201 |
| 2003/0046589 | A1 | * | 3/2003 | Gregg .......................... 713/201 |
| 2003/0074580 | A1 | * | 4/2003 | Knouse et al. ............... 713/201 |
| 2005/0044423 | A1 | * | 2/2005 | Mellmer et al. ............. 713/201 |
| 2006/0148402 | A1 | * | 7/2006 | Hagiwara .................... 455/41.1 |

FOREIGN PATENT DOCUMENTS

EP  1081914 A2  *  3/2001

* cited by examiner

*Primary Examiner*—Pramila Parthasarathy
(74) *Attorney, Agent, or Firm*—Schwegman, Lundberg & Woessner, P.A.

(57) ABSTRACT

Methods, systems, and data structures are provided for single sign-on with basic authentication on a transparent proxy. A user accesses a client to issue requests for content on an origin server. The transparent proxy requires user authentication before access can be granted to the origin server. The transparent proxy receives the requests and determines if the user is presently authenticated to the origin server. If the user is not authenticated, then the transparent proxy issues a basic authentication error to the client causing the client to prompt the user for authentication information. The transparent proxy directs the client to retain the authentication information and supply it with subsequent requests to the origin server. Further, the transparent proxy independently reconstructs the authentication information for subsequent requests directed to other servers under the handling of the transparent proxy, without requiring additional user action.

23 Claims, 4 Drawing Sheets

SINGLE SIGN-ON WITH BASIC AUTHENTICATION FOR A TRANSPARENT PROXY

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, Volera, Inc., All Rights Reserved.

FIELD OF THE INVENTION

The present invention relates to single sign-on for a transparent proxy, and in particular to providing single sign-on with basic authentication to the transparent proxy.

BACKGROUND OF THE INVENTION

Proxies have become vital applications and/or computing devices (e.g., servers) for organizations. Proxies provide more efficient use and handling of limited network resources. Thus, end-users can experience improved response time for desired content when the content is available in the proxy cache. Moreover, proxies can also be configured to act as firewalls (e.g., by enforcing security policies), routers, (e.g., by forwarding network packets to a next address within the network), gateways (e.g., by interfacing disparate network protocols), and/or multi-homing appliances (e.g., by permitting a single network port/address to be used to address a plurality of origin servers and/or origin sites).

One class of proxies is typically installed within close proximity (e.g., Local Area Network (LAN), and the like) to local client computing devices that they serve. These proxies are referred to as forward and/or transparent proxies. Forward and transparent proxies generally handle outbound network traffic originating from the clients that they serve. The forward and transparent proxies provide client access to external origin servers/sites via a Wide Area Network (WAN) connection, such as the Internet.

A forward proxy is known to and configured by each of the clients, before the clients can take advantage of the forward proxies capabilities. In contrast, a transparent proxy is neither known to nor configured by the clients; rather, the transparent proxy intercepts outgoing client requests to access origin servers/sites and transparently processes the requests on behalf of the clients. Therefore, transparent proxies can be more secure than forward proxies, since the clients do not know about the transparent proxies. Furthermore, transparent proxies can be more easily integrated into a network than forward proxies, since no client configuration is required.

Another class of proxies is reverse proxies that are generally installed in proximity to the origin servers that they serve within the network. Reverse proxies handle inbound network traffic destined for their origin servers. These proxies can also provide multi-homing capabilities to the network, such that requests for content originating at remote locations within the network are redirected to the reverse proxy, and services processing on or in communication with the reverse proxy resolve the correct origin server that is being requested.

A single server or computing device can be used as a forward proxy, a transparent proxy, and a reverse proxy. Alternatively, multiple computing devices can be used to install a forward proxy, a transparent proxy, and a reverse proxy. Moreover, a network configuration need not include each of a forward proxy, a transparent proxy, and a reverse proxy. Therefore, clients can access all three proxies, one of the three proxies, or two of the proxies within a network configuration. Moreover, depending upon the operation being performed by a client, the client can assume the designation of a server, and vice versa.

Conventionally, in network configurations having proxies, the clients are authenticated to the proxies and/or the origin servers and are identified as authenticated by using the IP addresses of the clients. This becomes problematic in systems where a single real IP address is used for multiple clients or where a single IP address is used to send and receive data for all of the clients within the system (e.g., Network Address Translation (NAT)). Thus, as soon as one client authenticates then all the clients within the system of the authenticated client are authenticated. As a result, authentication techniques have moved toward techniques that account for not only the clients being used, but also the users of the clients.

One application executed on clients that is omnipresent today, is a web browser that is used to access the World-Wide Web (WWW) over the Internet. A variety of commercially available web browsers exists and are well known to one of ordinary skill in the art. These existing web browsers have basic authentication for forward and reverse proxies, but not transparent proxies. Thus, if basic authentication is desired on a transparent proxy for user authentication, a different approach is needed. One approach is to have the transparent proxy engage in interactions with the web browser in order to create a cookie within the web browser that is used for subsequent transactions to the transparent proxy. A cookie is data that is stored by a remote server within a web browser, and used by the web browser when interacting with the remote server. However, since existing browser are configured to handle authentication for forward and reverse proxies through the use of specialized events referred to as authorization-required errors, in order to initially acquire the information necessary to create the cookie specialized web pages are sent by or redirected from the transparent proxy to the client browser.

A 407-authentication error is used for forward proxy authentication, where the client is authenticating directly to the forward proxy. Accordingly, once a user initially authenticates to the forward proxy, all subsequent requests to the forward proxy include authentication information from the client. A 401-authentication error is used for origin server/reverse proxy authentication, where the client is authenticating directly to a specific site or origin server. Thus, existing web browsers are not equipped to authenticate to transparent proxies that require independent authentication, where the web browsers have no knowledge of the existence of the transparent proxies, and where the transparent proxies are used to authenticate on behalf of the sites and/or origin servers, without having specialized interfaces that are pushed or redirected to the web browsers from the transparent proxies. Therefore, single sign-on with basic authentication that exists within conventional browsers is not available when web browsers use a transparent proxy and desire to use a web browser's existing basic authentication mechanisms.

As is now apparent to one of ordinary skill in the art, there exists a need for improved techniques that permit single sign-on using basic authentication to authenticate through transparent proxies. This need is particularly desirable with networks accessing the Internet through transparent proxies that handle outbound traffic destined for a plurality of sites/servers.

SUMMARY OF THE INVENTION

In various embodiments of the present invention, techniques for permitting single sign-on with basic authentication through a transparent proxy are provided. Client requests for origin servers are redirected (e.g., via a gateway, a router, a switch, software applications, and the like) to the transparent proxy, where the transparent proxy requires user authentication before permitting access to content associated with the origin servers. If no authentication information can be associated with user requests, then a client error is sent directing the client to obtain the authentication information from the user. In some embodiments, the client is also directed to use the authentication information for all requests for the origin servers handled by the transparent proxy during a session.

More specifically and in one embodiment of the present invention, a method for single sign-on with basic authentication is presented. A request is received by the transparent proxy and is associated with a user who desires access to an origin server. Next, a determination is made as to whether the request includes authentication information. Furthermore, if the request does not include the authentication information, then the transparent proxy issues an error to the client in order to receive authentication information. The transparent proxy uses the authentication information to authenticate the user for access to the origin server and access to one or more additional origin servers handled by the transparent proxy.

In another embodiment of the present invention, a method for single sign-on with basic authentication is provided. A request from a user is detected and associated with desired access to an origin server. The request requires authentication before the user is given access through a transparent proxy. Moreover, the transparent proxy detects the first request. Next, an error is sent to a user client that submitted the request. The error is identified by the client and processed as dialogs/panels within the client, and the user supplies authentication information for the desired access to the origin server. The transparent proxy receives the authentication information from the client, and directs the client to retain and use the authentication information for all subsequent requests for access to the origin server during a session, if the client supports the retention. Next, the transparent proxy authenticates the user for access to the origin server using the authentication information in order to initiate the request. Also, the transparent proxy uses the authentication information to authenticate the user for access to other origin servers handled by the transparent proxy during a session.

In still another embodiment of the present invention, a system for single sign-on with basic authentication is described. The system includes a transparent proxy, a client, an origin server, and an identity broker in communication with the transparent proxy that receives a redirected request from the client for access to the origin server. The transparent proxy redirects the requests to the identity broker. The identity broker determines if the request can be associated with authentication information needed to access the transparent proxy, and if not, the identity broker submits an error to the client causing the client to obtain the authentication information from a user of the client. The identity broker uses the authentication information to authenticate the user during a session.

In yet another embodiment of the present invention, an authentication data structure residing on a computer readable medium for single sign-on using basic authentication with a transparent proxy is presented. The authentication data structure includes an identity token representing a user access attempt from a client. The client sends authentication information after receiving an authentication error from the transparent proxy. The identity broker creates the identity token by using the authentication information, which includes a user name and/or password.

The transparent proxy then uses the user name and/or password to create the identity token, and the transparent proxy directs the client to retain and send the identity token with requests made by the user to access a site handled by the transparent proxy, if the client supports the retention. Moreover, the identity token can be independently reconstructed by the identity broker and continuously verified based on the identity of the user (e.g., user name and/or password) when the user is requesting access to the site and/or a plurality of additional sites handled by the transparent proxy during a session.

Still other aspects of the present invention will become apparent to one of ordinary skill in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
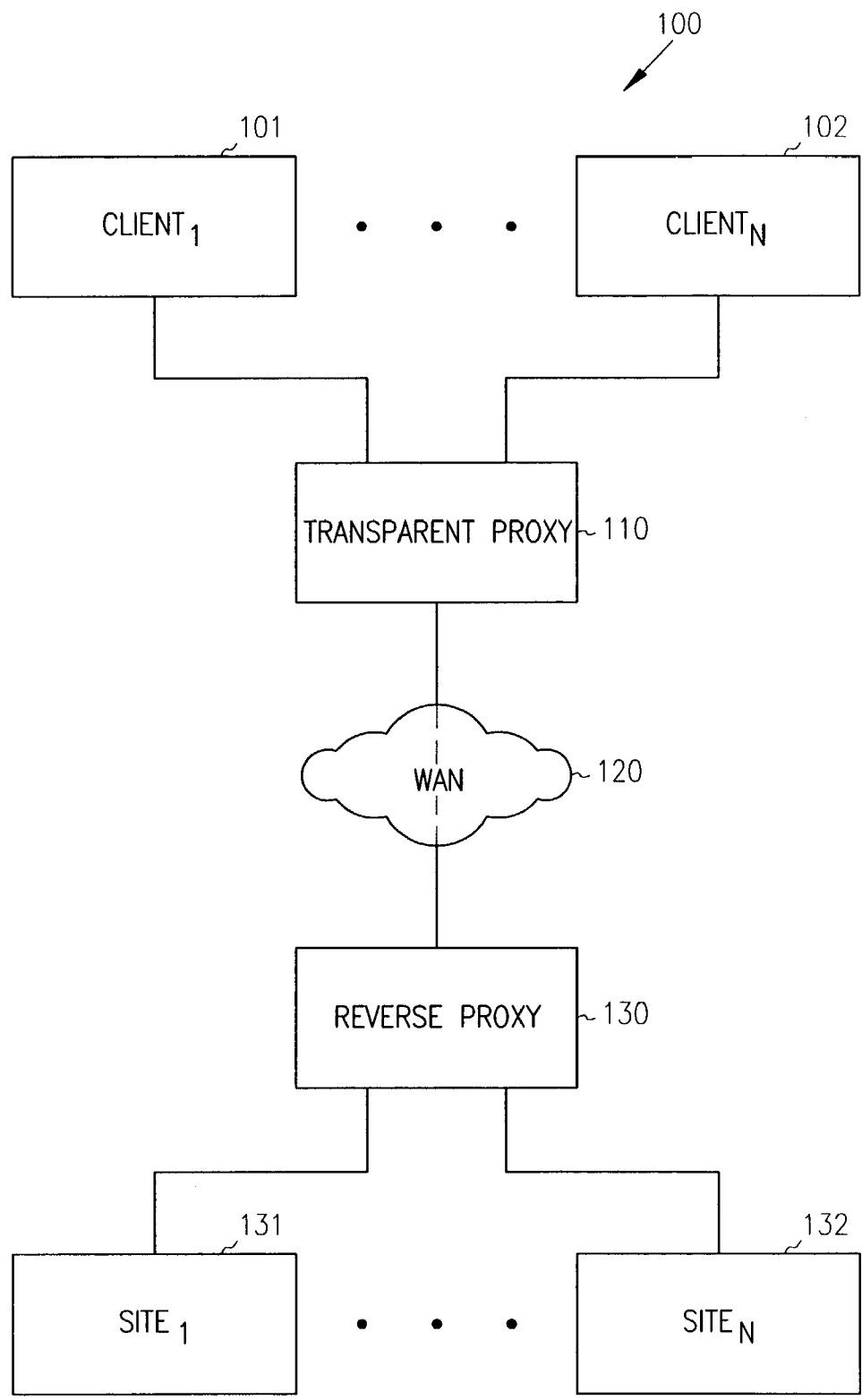
FIG. 1 is a diagram of an example network configuration using single sign-on with basic authentication for a transparent proxy, according to one embodiment of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, a transparent proxy is integrated to process outbound network traffic associated with clients. The clients can be processing as traditional web browsers readily available to one of ordinary skill in the art. Users interact with the browsers or the clients to issue outbound requests for origin servers or web sites handled by the transparent proxy. Unbeknownst to the users, the transparent proxy requires user authentication before access is permitted to content on the origin servers or web sites being handled by the transparent proxy. Correspondingly, user authentication to the transparent proxy is required before access to content on the servers/sites is granted. The transparent proxy performs the user authentication only once per session for access to all servers/sites handled by the transparent proxy.

Additionally, as one of ordinary skill in the art readily appreciates, the clients and users of the present disclosure need not be physical entities, since the clients and users can be logical entities, such as software applications or software agents executing on one or more processing devices and in communication with the transparent proxy.

In some embodiments, single sign-on with basic authentication is achieved by the transparent proxy detecting uniform resource locator (URL) links originating from the clients (e.g., redirected URLs received from a router, a gateway, a switch, a hub, a software application, and the like), and determining if the URLs and/or any header information can be associated with a proper authentication token to access the origin servers or web sites. If the authentication token is present, then the request is redirected to a transparent proxy service. If the authentication token is not present within the service, then a web browser authentication-error code of 401, which is usually associated with a web server, is sent to the client from the service. In response to this error, the client produces input dialogs/panels for the user to supply the authentication information (e.g., user name, password, and the like). In some embodiments, the authentication information is then set on the client by the transparent proxy service and sent each time a subsequent request is made from the client to the server/site associated with the origin server or web site handled by the transparent proxy.

Moreover, even when a subsequent request is not associated with the originally submitted server/site, the service can still authenticate a user when the user is accessing any server/site under the handling of the transparent proxy. Thus, all origin servers and/or web sites handled by the transparent proxy require only a single user sign-on with basic web browser supplied authentication, when implementing the tenets of the present disclosure.

Although the present invention is discussed with the use of a transparent proxy, it is readily apparent to one of ordinary skill in the art, that the invention is not so limited. In fact, the transparent proxy can be a forward proxy that uses the basic web browser authentication error code associated with a forward proxy to provide single user sign-on to one or more external domains handled by the forward proxy, when user authentication is required by the forward proxy.

Also, in some embodiments, the authentication information generated with basic authentication is valid for a client session. A session is a configurable period during which authenticated communications are permissibly allowed between a user (e.g., via client or web browser) and origin servers/web sites handled by the transparent proxy. A number of events can terminate the session, such as the client being closed (e.g., manually or indirectly), an elapsed period of inactivity is detected, and/or the user logging out of the session (e.g., manually or indirectly). When a valid session is terminated, the authentication information is not retained and is reacquired for any subsequently user-desired sessions.

Additionally, in various embodiments of the present disclosure, the authentication information can be temporarily stored within the client, such that when a session terminates the authentication information is no longer available in storage and/or memory of the client. In one embodiment, authentication information is retained by the client, which is a web browser, as a temporary web browser cookie that can be set by the transparent proxy on behalf of the browser. The authentication information can be in a user non-discernable format such that it is meaningless to a malicious user/application. The transparent proxy knows how to discern or associate the authentication information in order to produce an authorization/identity token, which can be matched to tokens associated with gaining access to the origin servers and/or web sites under the handling of the transparent proxy.

Furthermore, in one embodiment, the present disclosure is implemented within the Volera Excelerator product offerings, distributed by Volera, Inc. However, it is to be understood that the teachings of the present disclosure can be implemented in other existing products and/or standalone products. All such modifications to existing products and/or custom created products, which use the teachings of the present disclosure, are intended to fall within the scope of the present disclosure.

FIG. 1 illustrates a diagram of one example network configuration 100 that uses single user sign-on with basic authentication for a transparent proxy, according to one embodiment of the present invention. The example network configuration 100 is provided for purposes of illustration only and is not intended to limit the scope of the present disclosure. In fact, variety of additional configurations having one of more of the displayed components can be used without departing from the present disclosure. All such additional configurations are intended to fall within the scope of the present invention.

The example network configuration 100 includes a plurality of clients 101-102, a transparent proxy 110, a WAN connection 120, optionally a reverse proxy 130, and a plurality of origin servers/sites 131-132. Users gain access to the network configuration 100 via applications processing on or in communication with the clients 101-102. One such application is a web browser used to access the WAN 120 (e.g., Internet). The transparent proxy 110 is neither known to nor configured by the clients 101-102. When a client 101-102 accesses a link or provides an URL from a browser, a routing or switching device/application redirects the request to the address of the transparent proxy 110.

The transparent proxy 110 inspects the desired link or URL and determines whether the link or URL includes user authentication information. Initially, the transparent proxy 110 immediately detects that the link or URL is received from an entity other than an authentication manager or identity broker, and correspondingly redirects the link or URL to the identity broker. The identity broker is in communication with the transparent proxy 110. The identity broker saves off the original link or URL request received from the user and checks to see if the link or URL includes authentication information representing an authentication token. If the link or URL lacks an authentication token, then the identity broker determines if the user is associated with a valid authentication token, which indicates the user is presently authenticated for access to servers/sites 131-132 handled by the transparent proxy 110. However, if the user cannot be authenticated then the identity broker issues a 401-authentication error (e.g., basic browser authentication error) to the originating client.

When the client (e.g., applications such as a web browser application and others) receives the 401-authentication error, the client knows to use basic authentication applications to process the error. This basic authentication results in one or more dialogs/panels being displayed within the client to the user for receiving authentication information (e.g., user name/identification, password, and the like). Once this information is obtained, the information is sent to the identity broker to verify user identity and upon successful determination to construct an authentication/identity token. The identity broker then instructs the client to set/record the authentication/identity token within the client for a current session, if the client supports retention of the authentication/identity token. In some embodiments, the authentication token is stored in volatile memory associated with the client as a cookie. The client also knows that each subsequent link or URL request made from the client is to include the authentication information when access is desired for the originally requested origin server/site 131-132.

Moreover, when the client attempts to access a different server/site 131-132 during a valid session, which is different from the originally requested server/site 131-132, then if the new server/site 131-132 is associated with a server/site 131-132 that is handled by the transparent proxy 110, user authentication is still transparently and automatically achieved with the tenets of the present invention. For example, when the transparent proxy 110 detects a new link or URL, the new link or URL is redirected to the identity broker. The identity broker detects that the user associated with the new link or URL is already authenticated for the current session. Correspondingly, the identity broker authenticates the user and redirects the new link or URL back to the transparent proxy 110.

In some cases, for purposes of modularity and maintenance, the identity broker can effectively attach the proper user authentication token to the new link or URL and redirects the new link or URL back to itself for further authentication. Once the identity broker authenticates the user for the new link or URL, the new link or URL is redirected back to the transparent proxy 110 (e.g., other services or applications processing on or in communication with the transparent proxy 110). When the transparent proxy 110 receives the redirected new link or URL this time, the transparent proxy 110 knows that since it is being received from the identity broker that the user associated with the new link or URL is authenticated. Thus, the user achieves a single sign-on for all servers/sites 131-132 handled by the transparent proxy 110 when the user first attempts to access, one of the servers/sites 131-132 handled by the transparent proxy 110. As one of ordinary skill in the art readily appreciates, this improves the user's overall experience and access since multiple sign-in dialogs/panels are avoided as the user subsequently attempts to access other or additional servers/sites 131-132 handled by the transparent proxy 110.

In some embodiments, the client 101-102 may not support retention of an authentication/identity token, such as when the client 101-102 is a browser that does not permit browser cookies to be set or sent from the browser. Moreover, the client 101-102 may not support a transmission protocol (e.g., File Transfer Protocol (FTP)) that would permit the client 101-102 to send the authentication/identity token with requests associated with the original requested origin server/web site 131-132. In these embodiments, the techniques described above can be used to still authenticate the user with a single sign-on. The identity broker can independently reconstruct the authentication/identity token based on the identity of the user. Thus, even when clients 101-102 do not support retaining or transmitting the authentication/identity token, the user can still transparently achieve single sign-on authentication.

Moreover, once the identity broker receives initial authentication information from a user attempt to access a server/site handled by the transparent proxy, the identity broker constructs a user authentication token and sets the authentication token in the client 101-102. Next, the original link or URL request is redirected back to other applications processing on or in communication with the transparent proxy 110. These other applications know that the user associated with the original link or URL is authenticated, since the identity broker has already processed the link or URL. Accordingly, the transparent proxy's 110 cache is inspected for content represented by the original link or URL request. If the content is in the cache, then it is returned to the original requesting client for user consumption. If the content is not in the cache or is stale within the cache, then the transparent proxy 110 makes a request for the content over the WAN 120 to the appropriate servicing origin server/site 131-132. When the content is received, it is recorded in the cache and made available to the original requesting client for user consumption.

In some embodiments, one or more of the servers/sites 131-132 handled by the transparent proxy 110 can also require their own individual authentication. In these embodiments, this additional level of authentication is handled in accordance with each of the individual server/site 131-132 authentication requirements.

As is apparent now to one of ordinary skill in the art, a user can achieve single sign-on using an existing client's 101-102 basic authentication mechanisms through a transparent proxy 110 with the teachings of the present invention. Moreover, the user experiences only one authentication for all origin servers/sites 131-132 within the transparent proxy's 110 handling, even though all user requests are authenticated by the transparent proxy 110. This is an improvement over existing techniques, since no specialized interface techniques are required to effectuate the basic authentication, since this is achieved within existing clients 101-102 (e.g., web browsers and other applications). Thus, a user transparently accesses a plurality of servers/sites 131-132 with a single sign-on. Moreover, standard origin server/reverse proxy authentication errors (e.g., 401) are used to have the existing clients 101-102 provide the basic authentication on behalf of a proxy. Thus, the transparent proxy 110 of the present invention can also serve as a forward proxy and still use the authentication errors (e.g., 407) associated with browser clients that authenticate directly with the forward proxy.

The received authentication token is reused for all link or URL requests that are directed to origin servers/sites 131-132 that are within the handling of the transparent proxy 110. Furthermore, the authentication token remains valid for a session and becomes invalid when the session terminates. As previously presented, a session represents a period of time during which a user is interacting with origin servers/sites 131-132 via the client 101-102. A session can be terminated any number of ways, such as when a user logs out (e.g., manually or indirectly) of the session, when the client is closed (e.g., manually or indirectly), when an elapsed period of user inactivity is detected, and the like.

In some embodiments, a reverse proxy 130 handles the inbound link or URL requests received via the WAN 120 from a transparent proxy 110. The reverse proxy 130 can provide multi-homing and caching capabilities for the origin servers/sites 131-132. However, no reverse proxy 130 network configurations are required with the present disclosure. Thus, in these circumstances, the origin servers/sites 131-132 are directly accessible over the WAN 120 (not depicted in FIG. 1).

Figure 2:
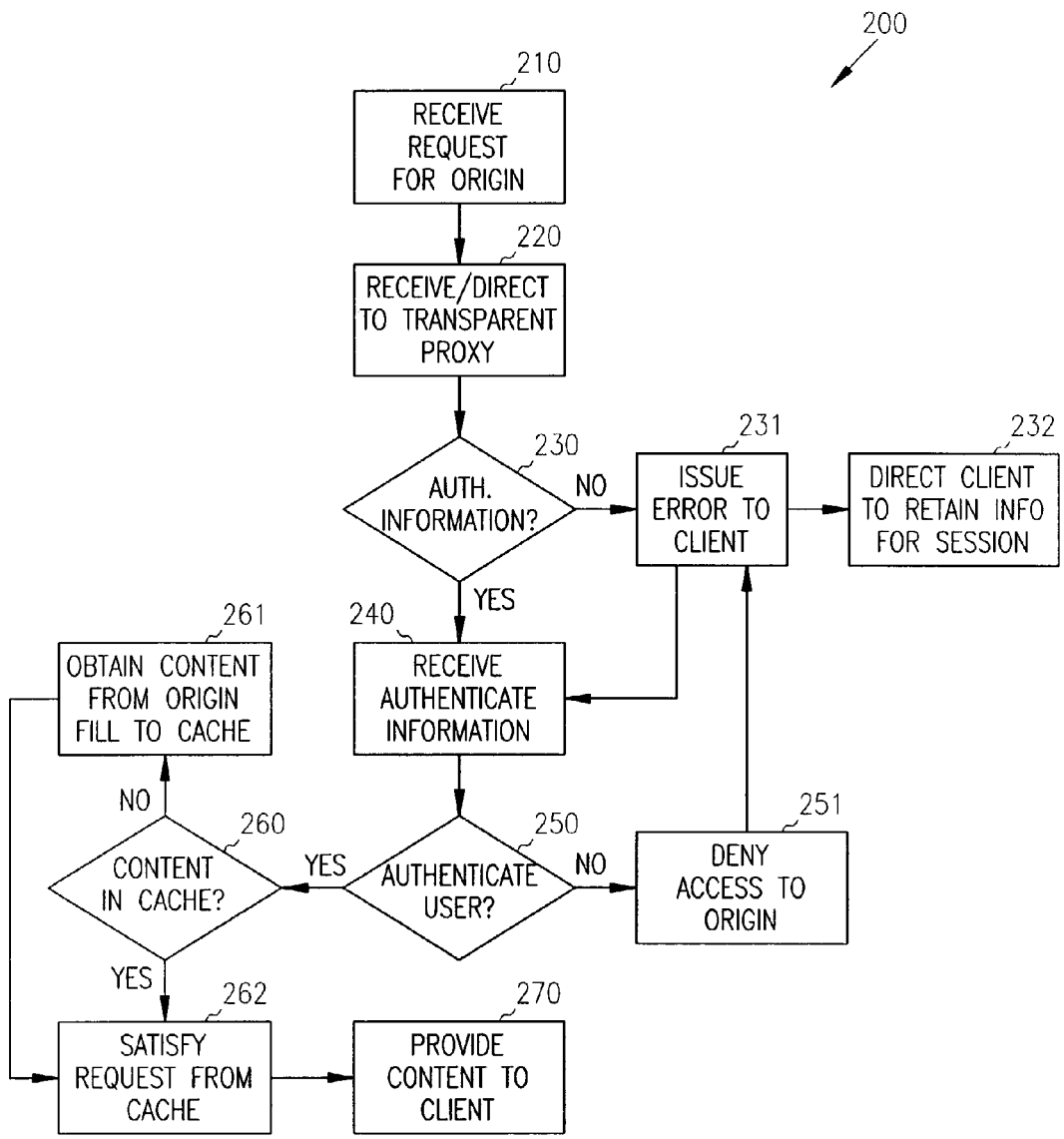
FIG. 2 is a flowchart representing a method for single sign-on with basic authentication, according to one embodiment of the present invention.

FIG. 2 illustrates a flowchart representing one method 200 for single sign-on with basic authentication, according to one embodiment of the present invention. The method 200 is implemented within one or more applications processing on or in communication with a transparent proxy. The transparent proxy handles outbound requests from clients for external origin servers/sites. Clients are applications that need not know of the existence and/or operation of the transparent proxy. The transparent proxy also performs a single user sign-on authentication between the clients and the origin servers/sites handled by the transparent proxy. Additionally, the transparent proxy handles content delivery from the origin servers/sites to the clients.

Initially, at 210, a request for an origin server is received by a client application, such as a web browser application. The request is associated with a single user accessing the client. At 220, the request is redirected out of the client to the transparent proxy (e.g., via a router, a gateway, a switch, a hub, a software application, and the like), and thus received by one or more applications processing on or in communication with the transparent proxy. The request can be a link or URL for content associated with an origin server/site being handled by the transparent proxy. The transparent proxy applications determine the origin server/site embodied in the request and determine whether the user associated with the request is presently authenticated to the transparent proxy before access to the content is permitted.

Accordingly, at 230, if authentication is required, then the transparent proxy applications determine if the request includes authentication information. If the request includes no authentication information (indicating a user is attempting a first access (sign-on) to origin servers of the transparent proxy for a current session, assuming the user's client does support transmission of the authentication information), then, at 231, an error condition is issued to the client browser application). The error is one known to the client, such as authorization-required error 401. The error directs the client (e.g., the browser application) to retain any authentication information (e.g. sign-on information such as user name, password, and the like) obtained from the user for the current session, as depicted at 232, if the client supports the retention and/or transmission of the authentication information. In some embodiments, the authentication information is in some non-discernable format that is only discernable to applications processing on or in communication with the transparent proxy.

Moreover, even when the received request does not include authentication information, applications processing on or in communication with the transparent proxy determine if the user associated with the request is presently authenticated to the transparent proxy. This circumstance arises when a user is attempting to access a different origin server/site under the handling of the transparent proxy, after the user has initially authenticated to one of the origin servers/sites or alternatively when the user's client does not support the retention and/or transmission of the authentication information. The client (e.g., a browser application) may know how to attach the authentication information (if supported by the client) to requests associated with the originally authenticated origin server/site, but the client will still not know that the authentication information is also required for other origin servers/sites handled by the transparent proxy, since the client may be neither aware of the transparent proxy nor configured to know the identity of origin servers/sites handled by the transparent proxy. Thus, the user experiences a single sign-on for all origin servers/sites under the handling of the transparent proxy.

When an initial authentication (e.g., sign-on) occurs, the client processes the authorization-required error as if it was an origin server/reverse proxy authentication request and does not need to know that it is actually interacting with applications on the transparent proxy. In this way, an existing client's basic authentication, interfaces, and techniques are used to acquire an initial user's sign-on information (e.g., authentication information). The client, in response to the issued error, pops up one or more dialogs/panels for the user to input his/her user name, password, and the like.

This information is identified as the authentication information and is transmitted back to the applications processing on or in communication with the transparent proxy. The information is then used to authenticate the user for a session to the transparent proxy by constructing an authentication/identity token (e.g., some user non-discernable format representing the authentication information). In one embodiment, the applications processing on or in communication with the transparent proxy then set this authentication token in the client, directing the client to provide this token with subsequent requests to the initially desired origin server/site, assuming the client supports retention and transmission of the identity token. Thus, a user achieves single sign-on for all servers/sites using the basic authentication of an existing client through a transparent proxy.

At 240, the identity token is received by or independently recreated by the applications processing on or in communication with the transparent proxy when a request for access to content on the origin server/site is received. In some embodiments, the identity token is part of the request received from the client (e.g., part of the URL string), such as when the user is accessing an origin server/site where the client knows and supports attachment of the identity token. In other embodiments, the identity token is acquired or reconstructed by the applications processing on or in communication with the transparent proxy when the user has been previously authenticated and/or is accessing other servers/sites, where the client is neither aware of nor supports the attachment of the identity token.

Any supplied identity token can be part of the header data associated with the request. The applications on the transparent proxy, strips the authentication information/token, which is then checked at 250 to determine if the authentication token matches valid authentication tokens associated with the user for a valid session. If there is no match, then at 251 the access request is denied and a corresponding error condition and/or message is sent to the client to inform the user that the supplied authentication information or identity token is invalid and/or stale. In some embodiments, at 251 when there is no match determined, then processing can resume at 231 by issuing another error to the client in order to re-obtain authentication information from the user that is used to create the identity token.

However, if the identity token can be created and is valid, then, at 260, content associated with or desired by the request is searched for in the transparent proxy's cache. If the content is not in the cache or is stale, then, at 261, the applications processing on or in communication with the transparent proxy request the content from the origin server on behalf of the client. Once the content is obtained it is placed in the cache of the transparent proxy. When the content is available in the cache, then, at 262, the request is satisfied with the content from the cache. Finally, at 270, the content desired by the request is provided to the client (e.g., via a browser application).

When the user makes a subsequent request for content on the origin server, the client may be capable of attaching the previously acquired identity token to the subsequent request. Under these circumstances, if the user makes a subsequent request for content on another origin server/site handled by the transparent proxy, then the applications processing on or in communication with the transparent proxy will acquire and/or independently reconstruct the user's identity token and authenticate the user as having been authenticated for a current session. Thus, no subsequent sign-on is required by the user to subsequently access the origin server or additional origin servers handled by the transparent proxy.

However, the identity token remains valid for a single session. Therefore, once a session is terminated the identity token is removed from the client and will not be provided by the client. Additionally, the user will not be capable of being authenticated by the applications that are in communication with the transparent proxy. Also, in one embodiment, the client retains the identity token as a temporary cookie within volatile memory of the client (e.g., a browser application).

One of ordinary skill in the art now understands upon reading the above disclosure how a user can achieve single sign-on to a plurality of distinct external origin servers/sites using the basic authentication techniques or applications of a client through a transparent proxy. This is achieved even when the client does not support retention or transmission of an identity token derived from user-supplied authentication information. Therefore, the present techniques simplify and streamline what has been done in the past in order to provide improved user access that is more readily maintained and implemented for transparent proxy network configurations.

Figure 3:
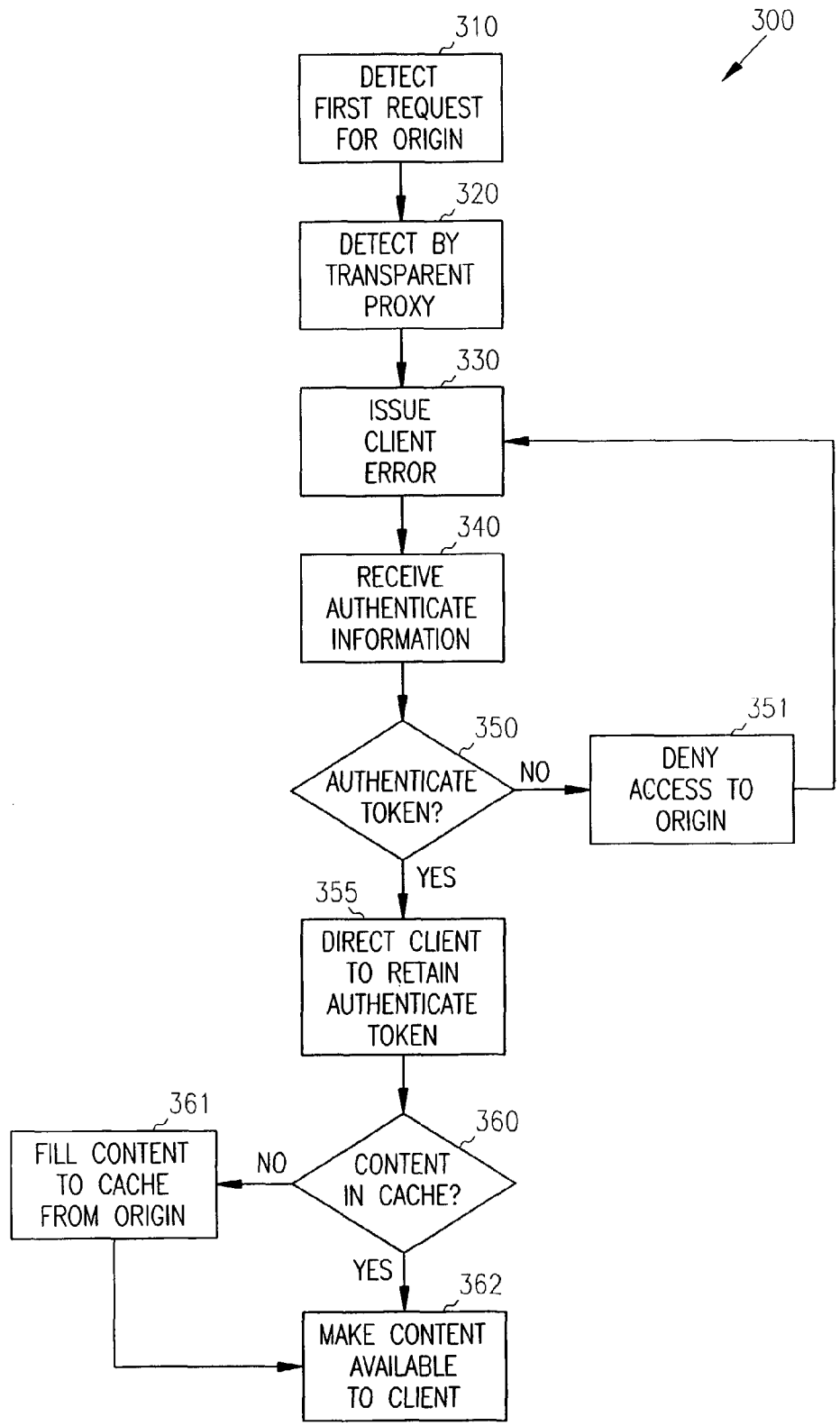
FIG. 3 is a flowchart representing another method for single sign-on with basic authentication, according to one embodiment of the present invention.

FIG. 3 illustrates a flowchart representing another method 300 for single sign-on with basic authentication, according to one embodiment of the present invention. The method 300 is implemented within one or more applications processing on or in communication with a transparent proxy. The transparent proxy handles outbound requests from client applications destined for origin servers/sites. The client applications, in one embodiment, are web browser applications where the origin servers/sites are accessed over the Internet or other network (e.g., WAN, LAN, and others). A user interacts with the client to supply one or more requests for the origin servers/sites. The requests can be represented as links or URLS, which in some embodiments include header information generated by the user's client.

At 310 a client detects a first or initial request from a user for access to an origin server/site. This request is redirected out of the client to applications processing on or in communication with a transparent proxy (e.g., via a router, a gateway, a switch, a hub, a software application, and the like). Accordingly, at 320, the transparent proxy detects the request from a user as a link or URL. The user associated with the request is checked to determine if authentication is required, and if so, then, at 330, a transparent proxy application issues a client error to the client being accessed by the user to submit the request. The error is an authorization-required error code that is readily recognized by the client, such as error 401 (usually associated with origin server/reverse proxy basic authentication errors).

Thus, the client generates a dialogs/panels that is displayed to the user within the client. The dialogs/panels receives authentication information (e.g., user name/identification, password, and others) from the user. At 340, the authentication information is then sent to the applications processing on or in communication with the transparent proxy in order to complete processing associated with the user's first and initial request. The transparent proxy applications use the information to construct an authentication/identity token, and in some embodiments, use the constructed authentication token to access an external service to determine if the user can be authenticated based on the supplied authentication information.

At 350, the applications processing on or in communication with the transparent proxy begin processing the request with the authentication token. If the authentication token cannot be authenticated, then, at 351, the request is denied and a message or error is sent to the client to inform the user that the authentication information supplied was invalid. In some embodiments, at 351, the process can be re-started at 330 to issue an error and start a user authentication process over again. If the information or token is authenticated, then, at 355, the client is directed to retain and use the authentication token for all subsequent requests to the initially requested origin server/site during a session, if the client supports retention and/or transmission of the authentication token. In one embodiment, the client is a browser that retains the authentication token as a temporary cookie available in volatile/non-volatile memory/storage for as long as a session remains active. In another embodiment, the client is an application that is directed to send the authentication token in or as part of requests made during an active session.

Accordingly, if the information is authenticated, then, at 360, a check is made of cache in the transparent proxy for content associated with satisfying the first request. If the content is not in the cache or is stale in the cache, then, at 361, the applications processing on or in communication with the transparent process acquire the content from the origin server/site, and fill the cache with the content supplied from the origin server/site. Accordingly, at 362, the content that satisfies the first request is made available to the client for user consumption from the cache of the transparent proxy.

As long as the session remains active, the user can issue a number of additional and subsequent requests for the initially requested origin server/site or any other origin servers/sites handled by the transparent proxy. When these subsequent requests are made, the client attaches or associates the authentication/identity token with the subsequent requests, if the subsequent requests are associated with the initially requested origin server/site and the client supports retention and/or transmission of the authentication/identity token. Accordingly, the transparent proxy applications validate the subsequent requests unbeknownst to the user. When subsequent requests are made that are associated with an origin server/site, which was not the initially requested origin server used for initial user authentication or when the client does not support retention and/or transmission of the authentication/ identity token), then the transparent proxy applications determine the identity of the user and determine if the user is presently authenticated. If the user is presently authenticated, then the user request for the desired origin server/site is also authenticated and permitted to proceed. In this way, a user achieves single sign-on with all origin servers/sites handled by the transparent proxy using the basic authentication techniques and applications of existing clients through a transparent proxy.

Figure 4:
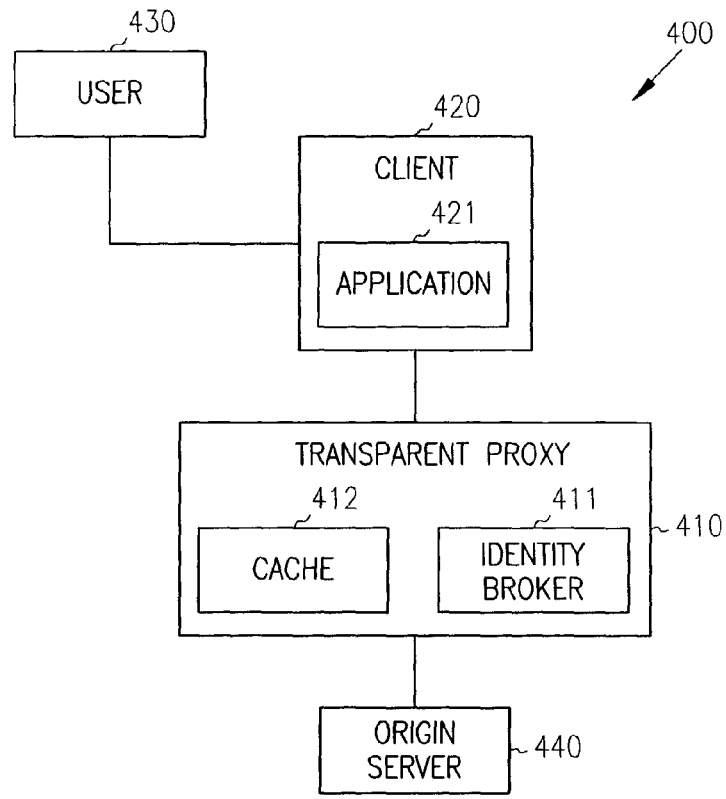
FIG. 4 is a diagram of a system that provides single sign-on with basic authentication, according to one embodiment of the present invention.

FIG. 4 illustrates a diagram of one system 400 that provides single sign-on with basic authentication, according to one embodiment of the present invention. The system 400 includes a transparent proxy 410 having an identity broker application 411, and a cache 412. The system 400 also includes a client 420 having an application 421. A user 430 interacts with the application 421. The system 400 also includes one or more origin servers 440. The components of the system 400 are configured within a network. The transparent proxy 410 provides transparent handling of outbound requests made from the client 420 to the origin server 440. The client 420, the transparent proxy 410, and the origin servers 440 can include a plurality of other applications (not shown in FIG. 4).

The identity broker 411 is in communication with the transparent proxy 410 and interacts with a number of other applications processing on or in communication with the transparent proxy 410. The identity broker 411 receives redirected requests from other transparent proxy applications 410. The redirected requests originate from the client 420 (e.g., application 421), and they are generated from user 430 interactions that occur with the client 420. When the identity broker 411 receives a redirected request, it saves the redirected request and determines if the redirected request is associated with a user 430 that requires authentication. If authentication is required for the user 430 associated with the request, then the request is inspected for the authentication information. If the authentication information is missing and the user cannot be authenticated based on an identity of the user 430, then the identity broker 411 knows that this particular request is a first or initial sign-on request being received from the user 430. A first request or initial sign-on request is produced or detected each time a user session associated with interactions to the origin server is started for a new session. Thus, when a user session is terminated, any subsequent user requests will be associated with a new session.

If a new session is detected (e.g., the request has no authentication information that is acquired or capable of being reconstructed), then the identity broker 411 submits an error to the client 420 (e.g., application 421). The error informs the client 420 that basic authentication is required to access the origin server 440 that is embodied in the request. In some embodiments, this error is a 401 error that is typically and generally used by applications 421 for authentication associated with origin server/reverse proxy interactions. The client 420 supplies the required authentication information to the identity broker 411. After user identity verification (e.g., via internal or external services), the identity broker 411 uses the authentication information to construct an identity token for the user, and then validates the user as an authorized user (e.g., via internal or external services). The identity broker 411 then sets the identity token within the client 420, if the client 420 supports retention and transmission of the identity token. Under these circumstances, the identity broker 411 directs the client 420 to retain and use the identity token derived from the user-supplied authentication information for all subsequent requests to the initially requested origin server 440.

In one embodiment, the client 420, in response to the error condition and in order to provide authentication information, generates one or more dialogs/panels for the user 430 to supply sign-on or the authentication information (e.g., user identification, name, password, and the like). The identity broker 411 then generates the identity token using the authentication information, wherein the identity token is in a non-discernable format. The identity broker 411 sets the identity token within the client 420, assuming the client 420 supports the retention and/or subsequent transmission of the identity token. In one embodiment, the identity token is retained as a temporary cookie, which is temporarily stored in the volatile or non-volatile memory of the client 420 and removed when a session terminates.

As described above, upon receipt of an initial sign-on, the identity broker 411 generates an identity token to authenticate the user-supplied authentication information in order to determine if the user is authorized to access the transparent proxy 410 controlling access to the origin server(s) 440. If a valid identity token is matched, then the original redirected request is forwarded back to other applications processing on or in communication with the transparent proxy 410. If a valid token is not matched, then access to the origin server 440 is denied, and the client 420 is appropriately notified with an error code and/or a message to restart another authentication process. However, if no identity token is present in subsequent user 430 requests, the identity broker 411 will still check to determine if the user 430 is already authenticated to the transparent proxy 410 for a current session. Any subsequent received requests directed to the initially requested origin server 440 or any other origin server 440 handled by the transparent proxy 410 does not require the identity broker 411 to issue an authentication error-code to the client 420. Thus, single user sign-on to all origin servers 440 handled by the transparent proxy 410 is achieved using basic authentication of the client 420 through a transparent proxy 410.

Once the identity broker 411 has authenticated a first request or subsequent requests, then the requests are processed by other applications executing on the transparent proxy 410. These applications determine whether content associated with the requests exist in the cache 412. If the content is not in the cache 412 or is stale in the cache 412, then the applications access the origin server 440 to acquire the content, which is then filled in the cache 412. Once the content is in the cache 412, then it is made available to the client 420 (e.g., application 421) for consumption by the user 430.

Of course as one of ordinary skill in the art readily recognizes, the content can be streamed from the cache 412 to the client 420. Moreover, other applications processing on or in communication with the transparent proxy 410 need not know how to authenticate a user 430 or whether a particular user 430 is in fact authenticated. This is so, because when the other applications receive requests redirected from a client 420, the requests are redirected to the identity broker 411. Thus, when the requests are received by the other applications from the identity broker 411, the other applications are assured that the requests have been processed by the identity broker 411 and are associated with authenticated users 430.

Although the identity broker 411 has been described as authenticating requests received from the client 420, it is readily apparent that this need not be the case. In fact, the identity broker 411 can be used to initially issue the error condition to the client 420 for initial user 430 sign-on attempts. Other applications processing on or in communication with the transparent proxy 410 can strip, identify, and authenticate, the authentication information included with requests. The identity broker 411 also need not reside on the transparent proxy 410, since the identity broker 411 can be an external services accessible to and in communication with the transparent proxy 410.

Figure 5:
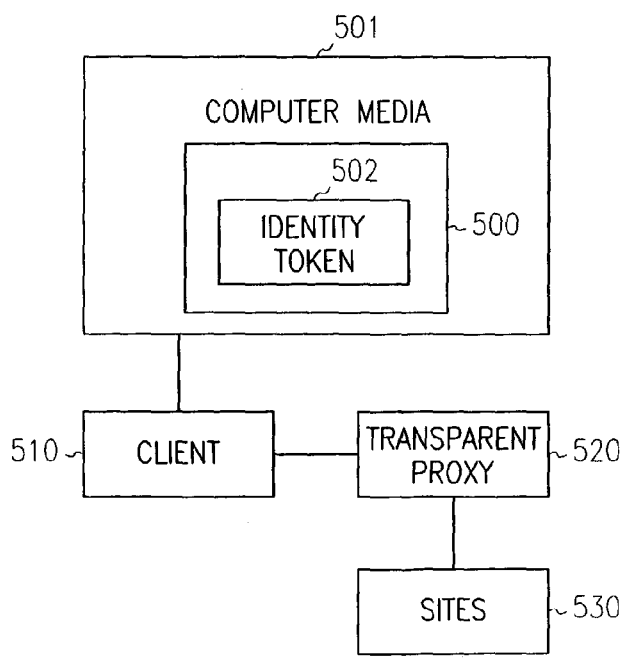
FIG. 5 is a diagram of an authentication data structure, according to one embodiment of the present invention.

FIG. 5 illustrates a diagram of an authentication data structure 500, according to one embodiment of the present invention. The data structure 500 resides in a computer readable medium 501 and includes an identity or authorization token 502. The identity token 502 represents a user accessing a client 510 and is constructed by an identity broker processing on or in communication with a transparent proxy 520 by using authentication information supplied from a client 510 using basic authentication techniques available in existing clients. The identity token 502 is constructed after the client 510 receives an error code from a transparent proxy 520 and supplies authentication information (e.g., user sign-on name, user password, and the like) to the identity broker. The error code, in some embodiments, is a 401-error code typically used by clients 510 when performing basic authentication on behalf of origin servers/reverse proxies.

Thus, the client 510 receives the error code from the transparent proxy 520 (e.g., via the identity broker) and acquires a user name and user password (e.g., authentication information) from the user interacting with the client 520. The user name and password are then represented in a non-discernable format as an identity token 502 and associated with an active session for the user to interact with one or more external sites 530 under the handling of the transparent proxy 520. The identity token 502 is then used to authenticate the user for access to the sites 530 handled by the transparent proxy 520.

Moreover, the identity token 502 is sent by the client 510 for each subsequent request received from the user that is associated with the initially requested site 530, which was embodied in the first or initial user request, when the client 510 supports retention and transmission of the identity token. In some embodiments, the client 510 is a web browser that retains the data structure 500 as a cookie. The cookie can be accessible to the client 510 via volatile or non-volatile storage/memory.

The transparent proxy 520 may receive the identity token 502 from the client 510 along with requests made by the user for the initially requested site 530. The site 530 can comprise a server farm or a web server farm. The transparent proxy (via the identity broker) continuously authenticates the identity token 502 for each subsequent request but only issues a single sign-on error condition request to the client 510, for first or initial access attempts to the sites 530. In cases where the client 510 is not capable of retaining or transmitting the identity token, then the identity broker still authenticates the user by independently reconstructing the identity token based on the identity of the user.

Moreover, if the user issues a subsequent request for a site 530 not identified by the initial user requested site 530, then the request is redirected on the transparent proxy 520 to the identity broker, where the identity broker determines if the user has already been authenticated to the transparent proxy 520. If the user has already been authenticated, then the request is sent back to other applications on the transparent proxy 520, where the other applications are assured of user authentication, since the identity broker and already processed the request. Thus, as one of ordinary skill in the art now understands, a user experiences single sign-on capabilities for a plurality of sites 530 handled by a transparent proxy 520 by using the basic authentication techniques of the user's client 510.

When a session is terminated, such as when a user logs out of the session, terminates the client 510, and the like, the data structure 500 is destroyed and will need to be recreated by the identity broker on behalf of the client 510 for any new session desired by the user, after the user supplies the proper authentication information.

Once the transparent proxy 520 (via the identity broker) validates a request, then content associated with the request is searched for in the transparent proxy's 520 cache. If the content is available in the cache, it is immediately made available to the client 510 for user consumption. If the content is not available or is stale in the cache, then the transparent proxy 520 acquires the content from the appropriate site 530 and fills the cache with the content, where it is provided to the client 510 for user consumption.

Although various embodiments of the present invention have been described using basic authentication techniques and applications readily accessible to existing clients (e.g., web browser applications, and the like), the invention is not so limited. In fact, other authentication techniques and/or applications that use Hypertext Transfer Protocol (HTTP) authorization headers, such as NTLM (Windows NT LAN Manager) authentication techniques, and the like can be used/implemented without departing from the teachings of the present invention.

One of ordinary skill in the art now understands upon reading and comprehending the present disclosure how a single user sign-on is achieved for a plurality of sites handled by a transparent proxy by using basic authentication associated with existing clients. This offers improved integration and implementation of transparent proxies into network configurations, and improved ease of use.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method implemented in a computer-readable medium and to process on a transparent proxy, the method for single sign-on with basic authentication, comprising:

receiving a request associated with a user to access an origin server, wherein the request is received by the transparent proxy;

determining if the request is associated with authentication information; issuing an error to a client to be processed by the client, if the request cannot be associated with the authentication information, and wherein in processing the error the client provides the authentication information; and authenticating the user for access to the origin server and to one or more additional origin servers using the authentication information, and wherein authentication to the one or more additional origin services use different authentication information and the transparent proxy automatically supplies that different authentication information in response to the authentication information indicating that the user is authenticated to the transparent proxy and thus capable of being transparently authenticated to the origin server and to the one or more additional origin servers by the transparent proxy having access to the different authentication information, the transparent proxy knows how to discern and associate the authentication information with the different authentication information for purposes of providing user access to the origin server and the one or more additional origin servers, and wherein the transparent proxy services multiple additional users for single sign-on functionality each user associated with a different client and wherein the transparent proxy processes outside of the client and different clients, wherein the transparent proxy performs authentication for the user and for the multiple additional users and the transparent proxy is integrated to process outbound network traffic associated with the client of the user and the different clients of the additional users, and wherein the transparent proxy is not known to the client or the different clients, and wherein when the client, or the different clients, accesses a link, a routing or switching device redirects the link to an address associated with the transparent proxy.

2. The method of claim 1 further comprising, recording and/or setting the authentication information for the user, wherein the authentication information remains valid for a session.

3. The method of claim 1 further comprising, instructing the client to retain the authentication information for a session with the origin server and to provide the authentication information with each subsequent request for access to the origin server during the session.

4. The method of claim 1 further comprising, satisfying the request from the origin server, if the request cannot be satisfied from a cache.

5. The method of claim 4 further comprising, filling the cache with content that satisfies the request, and providing the content to the client.

6. The method of claim 1 wherein the method is implemented within the transparent proxy, and the transparent proxy acts as an intermediary between interactions of the client, the origin server, and the one or more additional origin servers.

7. The method of claim 1 wherein in determining, the authentication information is retained by the client as a temporary cookie, and the client is a browser that uses the temporary cookie automatically with the request and all subsequent requests for access to the origin server.

8. The method of claim 1 wherein in determining, the authentication information is derived from an identity of a user associated with the request.

9. A method implemented in a computer-readable medium and to process on a transparent proxy, the method for single sign-on with basic authentication, comprising:

detecting a redirected request from a user for access to an origin server, wherein the request requires authentication before the user is given the access to the origin server, and wherein the request is detected by and redirected to the transparent proxy that also services a plurality of additional users;

issuing an error to a client being used by the user to submit the request, wherein the error is identified by the client and processed as a dialog/panel within the client, and wherein the user supplies authentication information for the access to the origin server, and wherein the transparent process operates outside the client;

receiving the authentication information from the client;

directing the client to retain and use the authentication information for all subsequent requests for access to the origin server during a session, if the client supports the retention; and continuously authenticating the user for access to the origin server and one or more additional origin servers handled by the transparent proxy by using the authentication information and further initiating the request, and wherein the one or more additional origin servers use different authentication information that the transparent proxy automatically supplies on behalf of the user in response to the presence of the authentication information, the transparent proxy knows how to discern and associate the authentication information with the different authentication information for purposes of providing user access to the origin server and the one or more additional origin servers, and wherein the transparent proxy is integrated to process outbound network traffic associated with the client for the user and multiple additional and different clients for the additional users and wherein the transparent proxy performs authentication for the user and the additional users and the transparent proxy is not known to the client or the different clients, and wherein when the client, or the different clients, accesses a link, a routing or switching device redirects the link to an address associated with the transparent proxy.

10. The method of claim 9 further comprising, determining if content residing in a cache can satisfy the request after authenticating the user, and if so, making the content available to the client where the content is consumed by the user.

11. The method of claim 9 further comprising, acquiring content from the origin server to fill a cache, wherein the content satisfies the request and where the user is authenticated, and wherein the content is made available to the client for consumption by the user.

12. The method of claim 9 wherein in directing, the authentication information is retained and used by the client as a token that expires when the session is terminated.

13. The method of claim 9 wherein in directing, the authentication information is provided by the client in the request.

14. The method of claim 9 wherein in directing, the session is terminated when an event is detected, and the event is at least one of the client is closed, the user logs out of the session, and a elapsed period of time expires during which no user activity is detected.

15. The method of claim 9 wherein in issuing, the error is a 401 error used for basic authentication within the client.

16. The method of claim 9 wherein in issuing, the authentication information is a user identification and a user password.

17. A system for single sign-on with basic authentication, comprising:

a transparent proxy;

a client;

an origin server;

an identity broker in communication with the transparent proxy that receives a redirected request from the client for access to the origin server; and wherein the identity broker determines if the request can be associated with authentication information needed to access the origin server, and if not, the identity broker submits an error to the client causing the client to initially obtain the authentication information from a user and initially provide the authentication information to the identity broker for use during a session, and wherein during the session the identity broker supplies different authentication information associated with the client to access other origin servers without interaction with the client by automatically supplying the different authentication information to the transparent proxy upon request during the session, the transparent proxy knows how to discern and associate the authentication information with the different authentication information for purposes of providing user access to the origin server and the other additional origin servers, and wherein the transparent proxy services a plurality of additional users and is to process outside the client and additional clients associated with the additional users, and wherein the transparent proxy is integrated to process outbound network traffic associated with the client and the additional clients and to perform authentication on behalf of the user and the additional users and the transparent proxy is not known to the client or the additional clients, and wherein when the client, or the additional clients, accesses a link, a routing or switching device redirects the link to an address associated with the transparent proxy.

18. The system of claim 17 wherein the client is a application being accessed by the user.

19. The system of claim 17, wherein the user is an application interfacing with the client.

20. The system of claim 17 wherein the origin server is associated with a plurality of additional origin servers handled by the transparent proxy, and wherein the identity broker authenticates a previously authenticated user to access the plurality of additional origin servers by acquiring the authentication information associated with the previously authenticated user during the session.

21. The system of claim 20 wherein the authentication information is not sent by the client for each of the subsequent requests in order to access the plurality of additional origin servers.

22. The system of claim 17 wherein the identity broker permits the user to sign-on once to the origin server and to other servers associated with the transparent proxy during the session and uses the client for providing the single sign-on by submitting the error to the client, wherein the error is recognized by the client as a sign-on request that is satisfied by the authentication information provided by the user.

23. The system of claim 17 wherein the client does not require prior configuration to interact with the identity broker in communication with the transparent proxy.

* * * * *